United States Patent Office

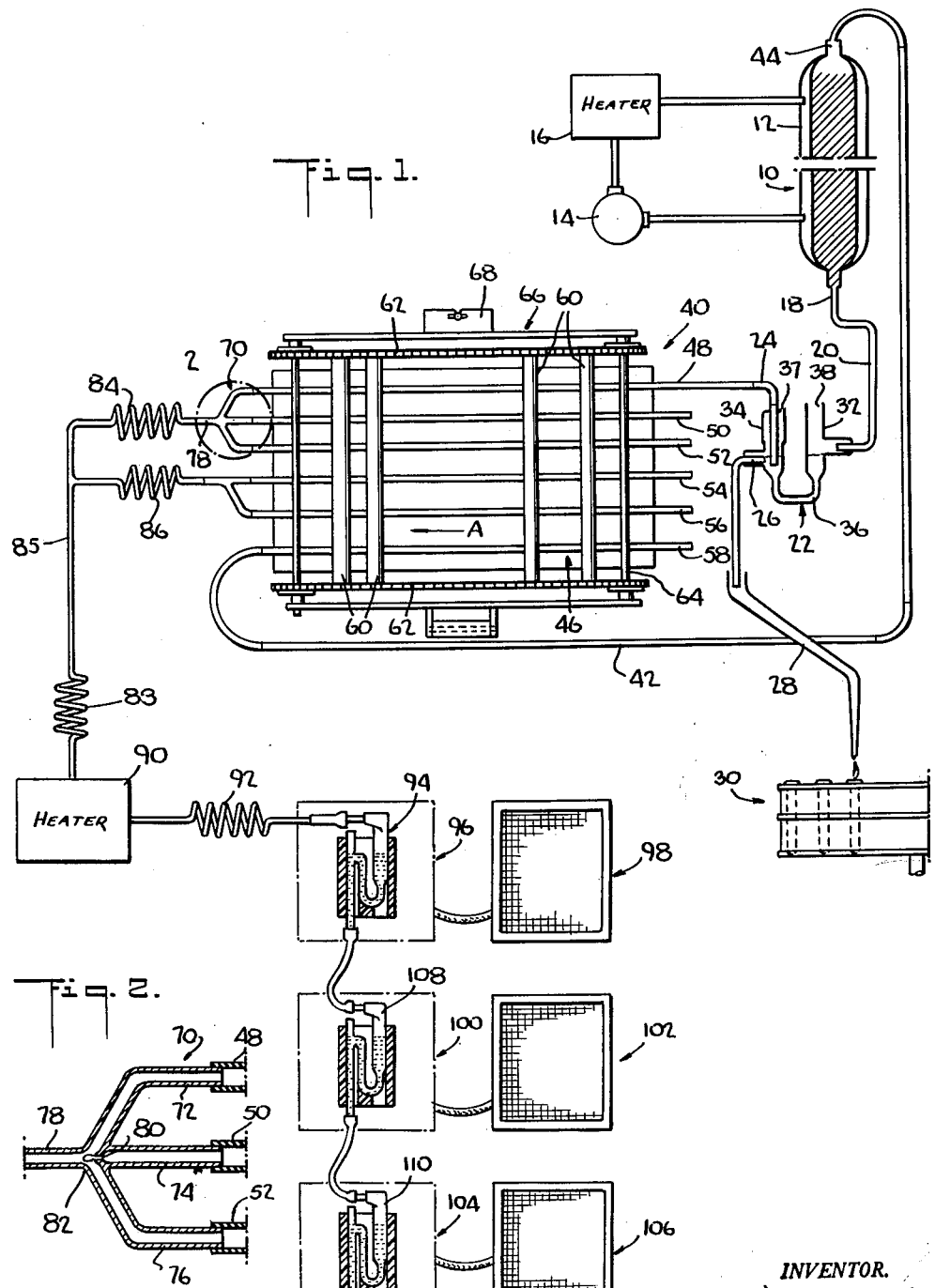

3,074,784
Patented Jan. 22, 1963

3,074,784
CONTINUOUS CHROMATOGRAPHIC
ANALYSIS APPARATUS
Andrés Ferrari, Jr., Scarsdale, N.Y., assignor to Technicon Chromatography Corporation, Chauncey, N.Y., a corporation of New York
Filed May 5, 1959, Ser. No. 811,033
3 Claims. (Cl. 23—253)

The present invention relates to a method and apparatus for continuous chromatographic analysis.

The subject matter of this invention is related to United States application Serial No. 548,037, filed November 21, 1955, now Patent No. 3,010,798, by me, Jack Isreeli and Edwin C. Whitehead, and has for its primary object the provision of a continuous chromatographic analysis apparatus and method involving a further development of the invention described in said earlier application.

One object of the present invention is to proivde for the continuous analysis of the eluents from a chromatography column and for the simultaneous collection of fractions of the eluents in an automatic fraction collector where predetermined measured successive quantities of the eluent are collected in a multiplicity of separate test tubes and thereafter utilized for providing a chromatogram. In other words, in accordance with this object of the present invention part of the eluent from the chromatographic column is transmitted automatically and continuously as it flows from the column, in the stripping operation, to apparatus wherein the successive flowing portions of the eluents are treated for colorimetric analysis and wherein the treated eluents are transmitted through one or more colorimeters of the flow cell type for operating a companion recorder or recorders to provide the chromatograms, said colorimeters being usually provided with light sources of different wave lengths, respectively, according to well understood practice, for example, as in the chromatographic analysis of amino acids, and simultaneously part of the eluent discharged from the column is delivered in measured fractions to the test tubes or other receptacles of an automatic fraction collector.

The above and other objects, advantages and features of the present invention will be fully understood from the following description considered in connection with the accompanying illustrative drawings.

In the drawings:

FIG. 1 is a schematic and partly diagrammatic illustration of a continuous chromatographic analysis apparatus and method of the present invention;

FIG. 2 is an enlarged detail sectional view of part of the apparatus.

Referring now to the drawings in detail, the chromatography column which is indicated by the numeral 10 is, as here shown, preferably provided with a jacket 12 for the circulation therethrough of water or other suitable liquid by means of a pump 14 in series with a heater 16 to maintain the column at an optimum temperature which may be thermostatically controlled, if so desired. The outlet 18 of the column is connected by means of a tube 20 to the eluent-distribution unit or receiver 22 which is provided with the outlet 24 from which all or a part of the eluent is supplied for continuous automatic colorimetric analysis and with an outlet 26 through which all or part of the eluent can be supplied to the distributing funnel 28 of an automatic fraction collector indicated at 30. Said automatic fraction collector is preferably of the type disclosed in United States Patent No. 2,710,715, assigned to the assignee of the present application.

The eluent distribution unit 22 is preferably made in one piece of glass and comprises the parts 32 and 34 which are interconnected at their ends by part 36. Part 32 is open at its upper end 38 so that the liquid eluent which collects in said distribution device is under atmospheric pressure. Also, part 34 has an air vent 37 so that the liquid in both parts are at the same level and under atmospheric pressure. The inlet end of outlet tube 24 is disposed below the level of liquid in the part 34 of the distribution device, which is also true of the outlet 26 by which part of the eluent may be supplied to the funnel 28 of the fraction collector.

In accordance with one aspect of the present invention, a proportioning pump 40 is provided for supplying the solvent or eluting liquid under suitable pressure through the tube 42 to the inlet 44 at the top of the chromatography column 10, and for pumping the eluent from part 34 of the distribution device 22 together with other fluids for treatment of the eluent for continuous colorimetric analysis and concomitantly for the provision of the chromatograms on the recorders operable under the control of the companion colorimeters, respectively. The proportioning pump 40 is preferably of the type shown in United States application, Serial No. 628,030, filed December 13, 1956, now Patent No. 2,893,324.

Briefly described, said pump comprises a platen 46 on which a series of resiliently compressible tubes, here numpered 48 to 58, respectively, are disposed in parallel spaced relation and which are simultaneously compressed progressively along their lengths by pressure rollers 60 which are carried by endless sprocket chains 62 operated by a suitable driving gear connected to one of the sprocket wheel shafts 64. Said rollers are mounted in a frame 66 which is movable about a horizontal pivot indicated at 68 from a position in which the pressure rollers engage the resiliently compressible tubes to a retracted position away from the platen for insertion and removal of the tubes when necessary. The tubes 48 to 58 may be of different internal diameters for supplying the various fluids in predetermined proportions, but all of said tubes, even though of different internal diameters, have the same wall thickness so that they are all fully compressed simultaneously progressively along their lengths while the rollers move in a direction of the arrow A in engagement with all of said tubes.

In the illustrated arrangement the eluent from the part 34 of the distribution device 22 is supplied through the pump tube 48 which is connected to a fitting 70 shown on larger scale in FIG. 2. Said fitting is preferably made of glass and comprises the inlet tubular parts or branches 72, 74 and 76 and the outlet tubular part 78. Tube 48 is connected to part 72 and the pump tubes 50 and 52 are connected to the parts 74 and 76 of the fitting, air or other inert gas being supplied through tube 50 to said fitting and a diluent liquid is supplied through the tube 52. Part 74 is provided with a small aperture 80 to form air bubbles in the liquids supplied through tubes 48 and 52 to the fitting 70 at the juncture 82 at which outlet 78 is connected, whereby the liquid which flows through said fitting 78 is formed into successive segments of liquid separated by segments of air, said air segments serving to automatically remove particles of liquid which might otherwise adhere to the inner walls of the tubes of the system. A helical mixing coil 84 is connected to outlet 78 and the latter is connected to a tube 85 which is also connected to mixing coils 84 and 86.

Substances for treating the liquid for colorimetric analysis are pumped through tubes 54 and 56 to mixing coil 86 and from the latter to tube 84 which is connected to mixing coil 88. For example, when the eluent from the column 10 contains an amino acid which is to be analyzed colorimetrically for providing one or more chromatograms, the diluent supplied by pump tube 52 is methyl cellosolve and the color reagent is ninhydrin in the presence of hydrindantin as a reducing agent. The ninhydrin and hydrantin are supplied by the pump tubes 54 and 56, respectively, to the mixing coil 86 and the resulting color reagent is supplied to the eluent flowing in tube 84 and is mixed therewith in mixing coil 88. The methyl cellosolve introduced by pump tube 52 is used for washing vestiges of previous sample eluents from the tubing of the system so as to return the recorder to its base line. Before the air is introduced by pump tube 50, the air is washed with $H_2SO_4$ to remove $NH_3$ and thus obviate reaction with the color reagent.

Reference has been made, for purposes of illustration, to specific chromatographic analysis such as that of amino acids but it should be understood that the present invention is not specifically concerned with any particular analysis in respect to the chemistry thereof but, on the contrary, relates broadly to chromatographic analysis of various eluents from a chromatography column and involves the principle of continuous colorimetric analysis by the apparatus as above and hereinafter described. More particularly, the principles of chemistry or the specific methods are not per se part of the present invention and therefore need not be described herein; they are known principles and methods but are applied and performed by the method and apparatus in continuous automatic fashion according to this invention.

The color reagent which flows from the mixing coil 86 and mixes with the eluent in the mixing coil 88 flows from the latter to the heating bath 90 which operates at a desirable temperature of 95° C. to produce a color change in the eluent for colorimetric analysis thereof. After this treatment in the heating bath 90, the eluent passes through a cooling coil 92 and from the latter to the flow cell 94 of the colorimeter 96 which operates a companion recorder 98 to provide a chromatogram.

As illustrated, additional colorimeter-recorders 100, 102 and 104, 106 are provided and the flow cells 108 and 110 of colorimeters 100 and 104 are in series with each other and with the flow cell 94 of the first colorimeter 96. The light sources of these colorimeters are of different wave lengths, respectively, in accordance with known practice so that chromatograms of different constituents of the eluent are formed on the recorders 98, 102 and 106 as a result of the flow of the eluent in succession through the flow cells 94, 108 and 110 in series. In lieu of the plurality of colorimeters, it is within the scope of this invention to utilize a single colorimeter and a multi-trace recorder and means associated therewith for providing light of plurality of different wave lengths from a single light source as described in the above-mentioned application, Serial No. 548,037.

In the operation of the apparatus, after the column 10 is prepared in accordance with known practice, the apparatus of the present invention is operated for stripping the column and for this purpose the proportioning pump 40 is operated to supply the solvent or eluting liquid, the latter being a well known buffer of suitable pH in the case of analysis of amino acids, to the top or inlet 44 of the column 10. The eluent flows from the column 10 through its outlet 18 and tube 20 to the distribution unit 22 and from the latter the eluent is pumped by the proportioning pump 40 for treatment for colorimetric analysis and operation of the recorders for providing the chromatograms as above described. Simultaneously with the pumping of the eluent to the colorimeters, a portion of the eluent flows by gravity from the outlet 26 of unit 22 to the test tubes of the automatic fraction collector indicated at 30 so that fractions are collected in said test tubes in correlated relation to the operation of the colorimeter recorders and thus made available for analysis either as a check analysis on the automatic part of the system or for special analysis in the event that the automatic part of the system provides chromatograms which are not definitely indicative of known substances in the eluents according to the color absorption properties of the eluents when treated with the predetermined color reagents for assumed known substances in comparison with standards in the colorimeters.

It will be understood that the volume of eluent withdrawn from the receiver 22 by the pump 40 for continuous automatic analysis depends upon the inner cross-sectional area of the tube 48, assuming a uniform predetermined speed of movement of the compressing rollers 60. However, in the normal operation of the apparatus the quantity of eluent withdrawn from the receiver 22 is less per unit of time than the quantity of eluent which flows into the part 34 of the eluent receiver, so that some of the eluent may flow into the automatic fraction collector 30 in timed relation to the flow of the eluent through the pump tube 48 in the continuous automatic analysis part of the apparatus.

An apparatus and method for use in the chromatography of amino acids are described in an article published in "Analytical Chemistry," volume 30, Number 7, pages 1190–1206, July 1958, in a paper entitled "Automatic Recording Apparatus for Use in the Chromatography of Amino Acids," by Darrel H. Spackman, William H. Stein and Stanford Moore, The Rockefeller Institute for Medical Research, New York 21, N.Y. The apparatus and method of my invention, while useful for other purposes, may be employed for performing the chromatography of amino acids according to the chemical principles described in said paper of Spackman, Stein and Moore.

While I have shown and described the preferred mode of practicing my invention, it will be understood that various changes may be made therein and will occur to skilled artisans in view of the present disclosure. Accordingly, I do not wish to be limited to the invention as herein specifically illustrated or described, except to the extent which may be required by the scope of the appended claims.

What is claimed is:

1. In chromatography analysis apparatus which comprises a chromatography column having an inlet for the eluting liquid and an outlet for the eluent liquid, an automatic analyzer including a conduit, a colorimeter recorder, and means for pumping the eluting liquid to the inlet of the column and the eluent liquid together with a color reagent through said conduit and from the conduit through the colorimeter, and an automatic fraction collector comprising a movable support for a series of fraction collection receptacles for moving said receptacles to an eluent receiving position for receiving fractions of the eluent liquid from the column simultaneously with the flow of eluent from the column through said conduit and in correlated relation to said flow of the eluent, said fraction collector including controlled means for intermittently moving said movable support for moving the receptacles seriatim to said eluent receiving position.

2. In chromatography analysis apparatus comprising a chromatography column having an inlet for the eluting liquid and an outlet for the eluent for the flow of the latter from the column when the latter is stripped, a receiver in communication with said outlet of the column to receive the eluent therefrom, said receiver having two outlets, an automatic fraction collector supplied with eluent from one of said outlets of the receiver, an automatic analyzer, and means for transmitting eluent from the other outlet of the receiver for separate treatment in said automatic analyzer concurrently with the delivery of the eluent to the fraction collector, said automatic fraction collector comprising a movable support for a series of fraction collection receptacles for moving said receptacles to a position to receive eluent from said one outlet of the receiver simultaneously with the flow of the eluent from the other outlet of the receiver to said automatic analyzer.

3. In chromatographyic analysis apparatus comprising the chromatography column having an inlet for an eluting liquid and a colorimeter recorder, a proportioning pump connected to said inlet of said column for supplying an eluting liquid thereto, and means in said proportioning pump operable concomitantly with the supply of said eluting liquid to the column for transmitting successive portions of eluent discharged from the column and a color reagent for treatment of the eluent by the color reagent and for transmitting said treated eluent to the colorimeter for operation of the colorimeter recorder to provide a quantitative chromatogram of the eluent in respect to a substance derived therein from the chromatography column, and an automatic fraction collector operable in timed relation to said pump for receiving fractional portions of the eluent discharged from the column for the collection of said fractional portions separately from the portions of eluent transmitted by said pump, said automatic fraction collector comprising a movable support for a series of fraction collection receptacles for moving said receptacles to an eluent receiving position for receiving fractions of the eluent liquid from the column simultaneously with the flow of eluent from the column through said conduit and in correlated relation to said flow of the eluent, said fraction collector including controlled means for intermittently moving said movable support for moving the receptacles seriatim to said eluent receiving position.

References Cited in the file of this patent

UNITED STATES PATENTS

| | | |
|---|---|---|
| 2,408,900 | Alston | Oct. 8, 1947 |
| 2,710,715 | Gorham | June 14, 1955 |
| 2,797,149 | Skeggs | June 25, 1957 |
| 2,865,303 | Ferrari | Dec. 23, 1958 |
| 2,899,280 | Whitehead | Aug. 11, 1959 |

OTHER REFERENCES

Sparkman: Anal. Chem., vol. 30, pages 1190–1206, 1958.